United States Patent
Grawrock et al.

(10) Patent No.: US 9,514,028 B2
(45) Date of Patent: Dec. 6, 2016

(54) SYSTEM AND METHOD FOR DETERMINING CORRECT EXECUTION OF SOFTWARE BASED ON BASELINE AND REAL TIME TRACE EVENTS

(75) Inventors: David W. Grawrock, Aloha, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 13/976,049

(22) PCT Filed: Mar. 29, 2012

(86) PCT No.: PCT/US2012/031303
§ 371 (c)(1),
(2), (4) Date: Jan. 22, 2014

(87) PCT Pub. No.: WO2013/147814
PCT Pub. Date: Oct. 3, 2013

(65) Prior Publication Data
US 2014/0143608 A1    May 22, 2014

(51) Int. Cl.
*G06F 11/36* (2006.01)
*G06F 11/34* (2006.01)
(Continued)

(52) U.S. Cl.
CPC ......... *G06F 11/3636* (2013.01); *G06F 11/076* (2013.01); *G06F 11/0709* (2013.01);
(Continued)

(58) Field of Classification Search
CPC .............. G06F 11/3616; G06F 11/3636; G06F 11/0709; G06F 11/076; G06F 11/3003; G06F 11/3089; G06F 21/45; H04L 63/1408
(Continued)

(56) References Cited

U.S. PATENT DOCUMENTS 5,257,358 A * 10/1993 Cohen ..................... 714/38.12
5,388,233 A *  2/1995 Hays et al. ............... 712/208
(Continued)

FOREIGN PATENT DOCUMENTS

JP        11066041        3/1999

OTHER PUBLICATIONS

European Patent Office, Extended Search Report mailed Oct. 21, 2015 in European Patent Application No. 12873302.9.
(Continued)

*Primary Examiner* — Gabriel Chu
*Assistant Examiner* — Paul Contino
(74) *Attorney, Agent, or Firm* — Trop, Pruner & Hu, P.C.

(57) ABSTRACT

An embodiment provides a level of assurance regarding correct operation of software. An embodiment creates baseline and real-time measurements of software and compares the measurements to determine whether the software is operating correctly. An application provider may include "tracing elements" in target software application. While producing the application the trace elements are detected and provide trace events, which collectively provide a "baseline trace" indicating proper application execution. The provider supplies the application and the baseline trace to a user. The user operates the application in real-time to produce a "real-time trace" based on the application still having trace elements that produce trace events (which collectively form the "real-time" trace). A comparator compares the baseline and real-time traces. If the traces are within a pre-determined range of each other the user has a level of assurance the software is operating correctly. Other embodiments are included herein.

21 Claims, 6 Drawing Sheets

(51) Int. Cl.
*G06F 11/07* (2006.01)
*H04L 29/06* (2006.01)
*G06F 21/54* (2013.01)
*G06F 11/30* (2006.01)

(52) U.S. Cl.
CPC ...... *G06F 11/3466* (2013.01); *G06F 11/3612* (2013.01); *G06F 11/3616* (2013.01); *G06F 11/3003* (2013.01); *G06F 11/3089* (2013.01); *G06F 21/54* (2013.01); *G06F 2201/865* (2013.01); *H04L 63/1408* (2013.01)

(58) Field of Classification Search
USPC ...................................................... 714/38.13
See application file for complete search history.

(56) References Cited

U.S. PATENT DOCUMENTS

| | | | |
|---|---|---|---|
| 6,658,602 B1* | 12/2003 | Nakano | 714/38.1 |
| 6,789,256 B1 | 9/2004 | Kechriotis et al. | |
| 6,961,925 B2* | 11/2005 | Callahan, II | G06F 11/3404 712/245 |
| 7,043,718 B1* | 5/2006 | Au et al. | 717/127 |
| 7,194,608 B2* | 3/2007 | Mericas | 712/227 |
| 7,379,999 B1 | 5/2008 | Zhou et al. | |
| 7,428,473 B2* | 9/2008 | Rodriguez et al. | 702/185 |
| 7,844,828 B2* | 11/2010 | Giraud et al. | 713/187 |
| 2004/0163079 A1 | 8/2004 | Noy et al. | |
| 2005/0114839 A1* | 5/2005 | Blumenthal et al. | 717/124 |
| 2005/0204155 A1* | 9/2005 | Ravi et al. | 713/200 |
| 2006/0156005 A1* | 7/2006 | Fischer et al. | 713/176 |
| 2008/0034255 A1 | 2/2008 | Nagano et al. | |
| 2008/0040707 A1* | 2/2008 | Araki | 717/127 |
| 2009/0019318 A1 | 1/2009 | Cochrane et al. | |
| 2009/0077544 A1* | 3/2009 | Wu | 717/160 |
| 2010/0122120 A1 | 5/2010 | Lin | |
| 2010/0310068 A1* | 12/2010 | Fischer | 380/43 |
| 2011/0131396 A1* | 6/2011 | May | G06F 9/30076 712/227 |
| 2011/0131452 A1* | 6/2011 | Kumar et al. | 714/34 |
| 2011/0172969 A1* | 7/2011 | Gara et al. | 702/186 |
| 2013/0042155 A1* | 2/2013 | Millet | G06F 11/3636 714/45 |
| 2013/0055214 A1* | 2/2013 | Harrison et al. | 717/127 |
| 2013/0254892 A1* | 9/2013 | Kaufman | 726/24 |
| 2013/0262837 A1* | 10/2013 | Knauth et al. | 712/222 |

OTHER PUBLICATIONS

International Searching Authority, "Notification of Transmittal of the International Search Report and the Written Opinion of the International Searching Authority," mailed Apr. 4, 2013, in International application No. PCT/RU2012/000535.

International Searching Authority, "Notification of Transmittal of the International Search Report and the Written Opinion of the International Searching Authority," mailed Nov. 30, 2012, in International application No. PCT/US2012/031303.

* cited by examiner

| Name | | Type | Description |
|---|---|---|---|
| TimeStamp | | Unsigned Integer (4 bytes) | Time stamp to sequence SVEN events. The SVEN HW adds the timestamp without any input from the software. The SVEN HW uses the timestamp to sequence events in the buffer and external SW can use the value to sequence additional events like OMAR operations. |
| Event Tag | | Unsigned integer broken into bit fields (4 bytes) | The event tag identifies the source and type of event. |
| | GenCount | 2 bits | Identifies generation of structure |
| | Module | 9 bits | Module identifier. Software will normally translate this identifier into a text string |
| | Unit | 5 bits | Identifies instance of running software |
| | Type | 6 bits | Type identifies the major type of event associated with the module |
| | Subtype | 10 bits | Subtype identifies specific action inside the type |
| Instruction count | | Unsigned integer (4 bytes) | Instruction count, delta from last SVEN call |
| Payload | | 20 bytes Form determined by type and subtype | The combination of module, type, and subtype determine the structure of the payload. The structure can be any combination of elements that add up to 20 bytes. UINT, LONG, CHAR are all possible and there is no requirement that all elements be the same type |

```
    Code Example                                            300
301 int FunctionA ()
302 {
303 DEVH_Func_Enter ("FunctionA")
304 //code does things with no use of any external services
305 ...
306 DEVH_Func_Exit (returncode)
307 Return returncode;
308 }

Expected Trace
    TS: 45.86 E:  Enter  N: FunctionA IC 2580
    TS: 00.02 E:  Exit  IC 1256
```

FIG. 3

```
    Code Example
401 int FunctionB ()
402 {
403 DEVH_Func_Enter ("FunctionB")

404 // do some code
405 ...
406 DEVH_Assert_Prior ("ExternalABC")
407 Call ExternalABC
408 DEVH_Assert_Post ("ExternalABC")
409 ...
410 DEVH_Func_Exit (returncode)
411 Return returncode;
412 }

Expected Trace 1
    TS: 45.86 E:  Enter  N:FunctionB  IC 2580
    TS: 45.86 E:  Prior  N:ExternalABC IC 1800
    TS: 45.86 E:  Post   N:ExternalABC IC 258900
    TS: 00.02 E:  Exit   IC 7820

Expected Trace 2
    TS: 45.86  E:  Enter  N:FunctionB  IC 2580
    TS: 45.86  E:  Prior  N:ExternalABC  IC 1800
    TS: 45.86  E:  Enter  N:ExternalABC  IC 8000
    TS: 00.02 E:  Exit  IC 250900
    TS: 45.86  E:  Post   N:ExernalABC  IC 258900
    TS: 00.02 E:  Exit IC 7820
```

FIG. 4

```
    Code Example
501 int Functionc ()
502 {
503 DEVH_Func_Enter ("Functionc")
504 DEVH_Assert_Loop("Start", count)
505 For (i=0;i<count;i++)
506 {
507     DEVH_Assert_Loop("Iteration", count);
508     // do some stuff
509     ...
510 }
511 ....
512 DEVH_Func_Exit (returncode)
513 Return returncode;
514 }

Expected Trace
    TS: 45.86 E:  Enter  N:FunctionC  IC 2580
    TS: 45.86 E:  Loop Start Count:10 IC 1800
    TS: 45.86 E:  Loop Iteration Count:0 IC 882
    TS: 45.86 E:  Loop Iteration Count:1 IC 460
    TS: 45.86 E:  Loop Iteration Count:2 IC 460
    TS: 45.86 E:  Loop Iteration Count:3 IC 460
    TS: 45.86 E:  Loop Iteration Count:4 IC 460
    TS: 45.86 E:  Loop Iteration Count:5 IC 460
    TS: 45.86 E:  Loop Iteration Count:6 IC 460
    TS: 45.86 E:  Loop Iteration Count:7 IC 460
    TS: 45.86 E:  Loop Iteration Count:8 IC 460
    TS: 45.86 E:  Loop Iteration Count:9 IC 460
    TS: 00.02 E:  Exit IC 7820
```

FIG. 5

```
    Code Example
601 int FunctionD ()
602 {
603 DEVH_Func_Enter ("FunctionD")
604 ...
605 DEVH_Assert (IF);
606 If (A>40)
607 {
608 DEVH_Assert (IF branch, ">40")
609 ...
610 }
611 Else
612 {
613   DEVH_Assert (IF branch, "not >40")
614   ...
615 }
616 DEVH_Func_Exit (returncode)
617 Return returncode;
618 }

Expected Trace 1
    TS: 45.86 E:  Enter  N:FunctionD  IC 2580
    TS: 45.86 E:  IF IC 1800
    TS: 45.86 E:  IF Branch >40 IC 220
    TS: 00.02 E:  Exit  IC 7820

Expected Trace 2
    TS: 45.86 E:  Enter  N:FunctionD  IC 2580
    TS: 45.86 E:  IF IC 1800
    TS: 45.86 E:  IF Branch not >40 IC 310
    TS: 00.02 E:  Exit  IC 6500
```

FIG. 6

```
    Code Example
701 int Functione ()
702 {
703 DEVH_Func_Enter ("FunctionE")
704 DEVH_Asssert_Resource(R1)
705 ...
706 Code accesses R1
707 ...
708 DEVH_Func_Exit (returncode)
709 Return returncode;
710 }

Expected Trace
    TS: 45.86 E:  Enter  N: FunctionE IC 2580
    TS: 45.86 E:  Resource V:  R1  IF IC 600
    TS: 00.02 OMAR R1
    TS: 00.02 E:  Exit  IC 7820
```

FIG. 7

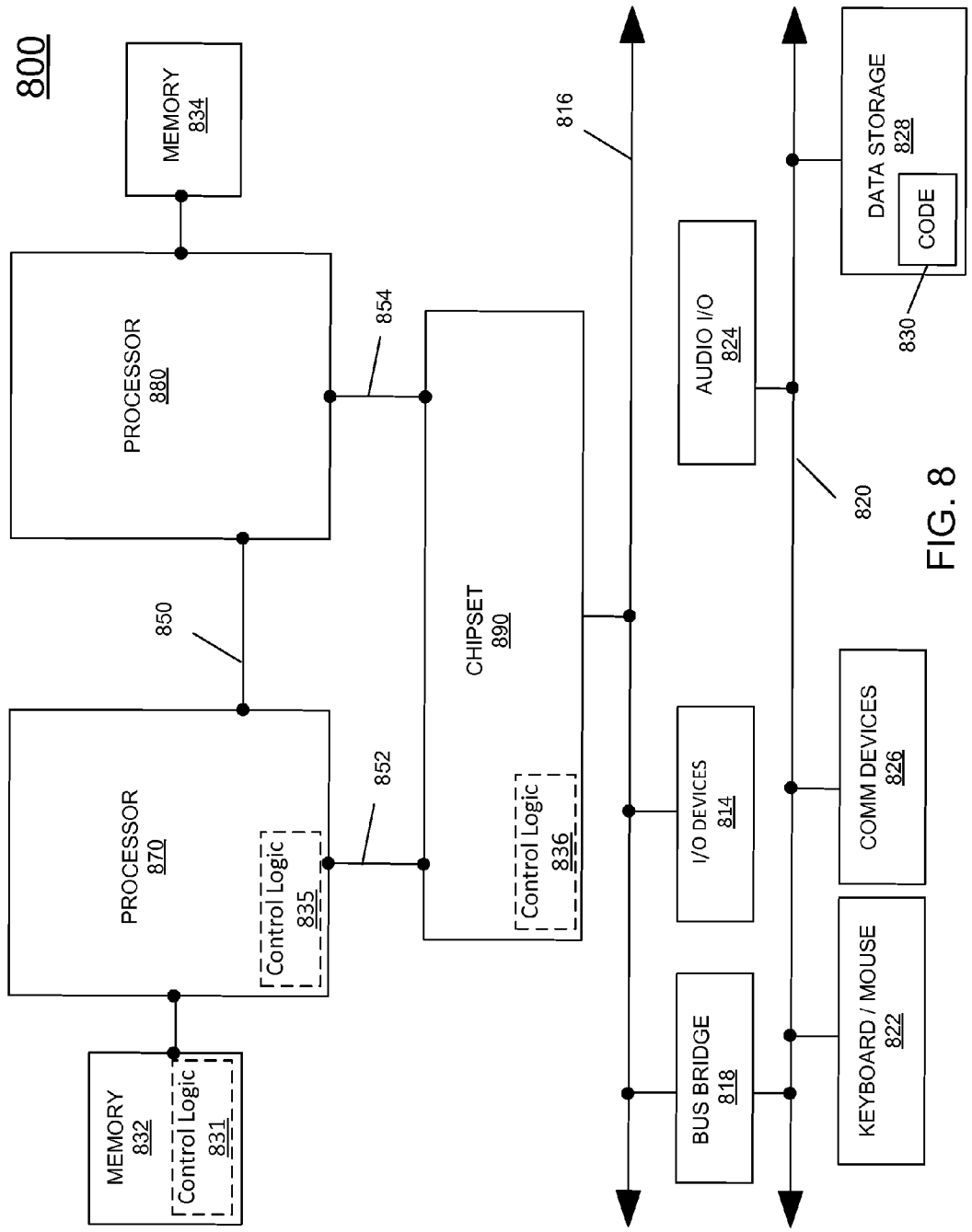

SYSTEM AND METHOD FOR DETERMINING CORRECT EXECUTION OF SOFTWARE BASED ON BASELINE AND REAL TIME TRACE EVENTS

BACKGROUND

Software may stop working correctly for several reasons including "malware" and "software rot." Malware is a source of problems on computer systems and it comes in a variety of forms with unlimited vectors of attack. Regardless of the form and vector, the end result of malware is that the original software does not work correctly. "Rot" (also known as "software aging") concerns the condition that after some period of time software stops working correctly. The reasons could be resource consumption, bugs, or transient hardware faults like stray energetic particles striking a chip. Whatever the reason for the rot, the end result is that the software stops working correctly.

Considering the wide ranging forms of malware and rot, the software community faces challenges in providing assurance to software users that a piece of software is indeed executing correctly. While it is possible to ensure the correct loading of the software (e.g., through features like Intel® Trusted Execution Technology), obtaining reliable information regarding the actual execution of that software, after it has been loaded, is challenging.

BRIEF DESCRIPTION OF THE DRAWINGS

Features and advantages of embodiments of the present invention will become apparent from the appended claims, the following detailed description of one or more example embodiments, and the corresponding figures, in which:

FIG. 2 includes a schematic structure for a trace event in an embodiment of the invention.

FIGS. 3-7 address expected trace outputs from various software architectures in various embodiments of the invention.

FIG. 8 includes a system for use with embodiments of the invention.

DETAILED DESCRIPTION

Figure 1:
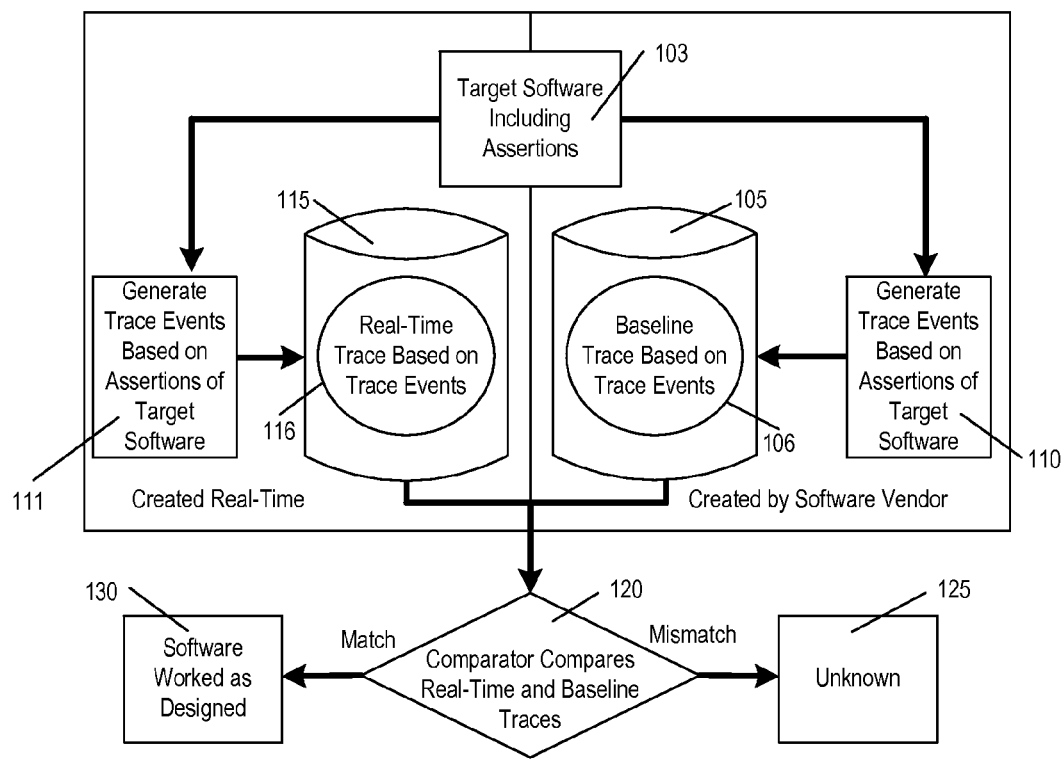
FIG. 1 includes a system for determining whether software is operating correctly in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment provides a level of assurance regarding correct operation of software. An embodiment creates baseline and real-time measurements of software and compares the measurements to determine whether the software is operating correctly. An application provider may include "tracing elements" (also referred to herein as "assertions") in a target software application. While producing, developing, testing, shipping or otherwise working with the application the trace elements are detected and provide trace events (e.g., instruction counts (ICs)), which collectively provide a "baseline trace" indicating proper application execution. The provider then supplies the application, which still includes the trace elements, and the baseline trace to a user. The user operates the application in real-time to produce a "real-time trace" based on the application still having trace elements that produce trace events (which collectively form the "real-time" trace). A comparator then compares the baseline and real-time traces. If the traces are within a pre-determined range of each other the user has a level of assurance the software is operating correctly.

This level of assurance has many applications such as, for example, malware detectors and attestation providers for use by corporate information technology (IT) groups and users of all kinds. More specifically, this level of assurance has applications with password processing (e.g., assurance that password data is only accessible to, and in use by, the password processor), online banking (e.g., assurance that the only software process dealing with the user's bank account information is the authorized bank software), online gaming (e.g., assurance that an individual is not cheating and the supplied software is executing the game correctly), digital rights management (DRM) (e.g., assurance that the enforcement of the DRM rules is occurring in the DRM software), health records (e.g., assurance that the authorization around access to the health records is followed according to the appropriate policies), financial software (e.g., knowledge that both transfers and automatic trading are happening correctly), cloud computing (e.g., assurance that the software necessary to run the cloud application is running correctly), and the like.

FIG. 1 includes a system for determining whether software is operating correctly in an embodiment of the invention. System 100 combines two processes: (1) trace collection, and (2) a comparison between a real-time trace and a baseline trace. For instance, a software provider (e.g., software developer and/or someone with access to source code) instruments "target" software 103 (sometimes referred to herein as code, application, and the like) to generate trace events (using trace elements or "assertions" embedded in code) in block 110 and then, from the generated trace event or events, creates baseline trace 106 (stored in buffer 105) when, for example, the software is ready to ship to users. After shipping, the real-time running or executing software generates trace events (using trace elements or assertions still embedded in the shipped software) in block 111 to generate real-time trace 116 (stored in buffer 115) collectively formed from the trace event or events. A comparison function (referred to herein as a "comparator") then compares real-time trace 116 to baseline trace 106 in block 120 and if the traces match within a predetermined acceptable amount, a user may have a level of assurance software 103 is executing as the vendor expected it to (130). Otherwise the user has no such assurance (125).

The mechanisms for generating trace events are varied. In one embodiment a system such as the System Visible Event Nexus (SVEN) is used. SVEN is a hardware mechanism (available at the time of filing at, for example, at www*videon-central*com) that enables the creation of the traces. In an embodiment SVEN is in use both by the software vendor to create the baseline trace (blocks 110 and 106) and the real-time trace (blocks 111 and 116) when desiring to gain assurance of correct operation. SVEN processes the assertions to generate SVEN events that collectively form a trace in SVEN buffer 105. For SVEN to operate, software 103 may include SVEN assertions. The vendor or any other party compiles the assertions into code 103 and they remain present even on production releases. The SVEN assertions (blocks 110, 111) may generate SVEN events that follow a fixed format such as that found in FIG. 2 (discussed further below). Software 103 asserts a SVEN event (blocks 110, 111) and the nexus collects the event and puts it into the buffer (buffer 105 when concerning the baseline trace and buffer 115 when concerning the real-time trace).

Buffers 105, 115 may be circular buffers that allow for the constant input of SVEN events. Buffers 105, 115 may include integrity protection to ensure that only SVEN places items into the buffers. It is possible due to threats to exposure of sensitive data that the reading of the buffer requires protection.

In one embodiment buffers 105, 115 may be included in "stolen physical memory" wherein a BIOS would reserve the stolen memory area and indicate, through range registers, the location. The range registers would enable the hardware protection of only SVEN writing to the buffer. An embodiment may require that SVEN be the only agent capable of writing to the buffer.

SVEN may create buffers 105, 115 of information one event at a time. The events may be 32 bytes in size and the content may be event specific. FIG. 2 shows an example layout of SVEN event 200. Of note, the "instruction count" (IC) includes a count of instructions that have transpired since the last SVEN call. Also, note the "TimeStamp" entry which allows for the sorting of SVEN events into an ordered stream of events. The timestamp is sufficient for ordering and may be used as a trace, instead of the IC, in some embodiments. However, in other embodiments the IC establishes the trace value. Also, SVEN event 200 may include, as part of the header, the IC for the thread that initiates the SVEN event. Just as the software has no control of the timestamp, the software may have no control of the IC. In an embodiment, the SVEN event size is 32 bytes.

In an embodiment the IC includes various properties concerning a single thread (e.g., the IC is from the initiating thread only and no other execution thread influences the count), no interruptions (e.g., the IC does not include any instructions from ring 0, secure mode management (SMM), or any other interrupt service), no load influence (e.g., if other operations are occurring on the device, the IC does not change in response to the increased load).

Embodiments may "instrument" (e.g., embedding trace elements or assertions) in various applications. For example, an embodiment may instrument "input parsers", which may cause security problems and are therefore good candidates for instrumentation. Incorrect handling of input allows attackers to insert malware into the application. A properly executing parser drastically reduces the ability of malware to insert information into the application. Thus, embodiments can provide evidence of correct parser execution. If embodiments can detect incorrect behavior doing so would allow the application to better defend itself from malware.

An embodiment may be used to instrument "heartbeat applications". Such applications check, at regular intervals, for evidence of specific conditions. One example is the heartbeat application that regularly checks for the execution of an anti-virus (AV) program. If the heartbeat application does not detect the AV application, the heartbeat application informs the user, management consoles, and the like regarding the lack of AV execution detection. Such instrumentation may allow one to determine the health of the heartbeat application and whether the program is working correctly.

An embodiment may focus on detecting software rot. Rot can occur in various sections of a program. Instrumentation could be performed in key areas or portions of programs or throughout such programs.

Other areas for instrumentation include cryptographic functions and the like.

While several of the above passages discuss instrumenting software to produce baseline and real-time traces (and instrumentation will be further addressed in regards to FIGS. 3-7), attention momentarily turns to how those values are compared. The software application for conducting such a comparison (referred to at times herein as a "comparator" in block 120 of FIG. 1) may come paired with target software 103. In an embodiment the traces resulting from properly instrumented and defined software will not reveal information on keys or other such sensitive data. Thus, the production and exposure of the baseline and run-time traces need not be access protected (but can be in other embodiments). Also, in an embodiment there is no restriction on the use of the comparator of block 120 so the comparator can work without any authorization. This may simplify the code of the comparator and the distribution of the comparator. In an embodiment the comparator has access to the baseline and runtime traces but does not require write access to either of the traces. In an embodiment, the comparator may be precluded from writing to any buffer related to either trace (e.g., buffers 105, 115). In an embodiment the comparator may have functionality to validate the integrity of either flow but in other embodiments the comparator has no such capability.

Regarding baseline trace 106, the baseline trace may be provided by the software provider (e.g., the software programmer, distributor, or user of the software). The baseline trace represents the execution of a correctly functioning program. As mentioned above, in some embodiments comparator 120 does not validate the providence and integrity of baseline trace 106. However, in such an instance the software provider may provide a digital signature on the baseline trace that will enable callers of the comparator to validate the providence and integrity of the baseline trace 106. In some embodiments entities other than the software provider may create baseline traces (e.g., when software runs in a special environment that makes the creators baseline trace inaccurate).

In an embodiment comparator 120 is not involved in the collection of runtime trace 116. The comparator does not validate the providence or integrity of the runtime trace. Instead, the caller of the comparator is responsible for validating the providence and integrity of the runtime trace in some embodiments. In an embodiment the ecosystem that collects real-time trace 116 and submits it to the comparator must correctly match a runtime trace to a baseline, validate the integrity of both baseline and runtime, and then disseminate the comparator report.

In an embodiment comparator 120 may work online and/or offline. In the online mode, the comparator monitors the real-time trace and responds "as soon as possible" to a detected anomaly. In offline mode, the comparator reviews a previously recorded real-time trace and delivers a verdict if the trace did or did not match. In an embodiment the comparator may compare two traces stored in two buffers (e.g., buffers 105, 115) or even a single buffer. The buffers may be static or dynamic buffers. The comparator may operate on the same platform or a different platform from the platform that collected the runtime trace. In an embodiment the comparator (e.g., offline comparator) may operate as a ring three application (based on a privilege ring hierarchy where lower layers or rings are more privileged).

However, in some embodiments (e.g., online comparator working synchronously with the collection of the runtime trace) comparator 120 may execute in a special environment. Such an environment may allow, for example, the comparator to safely notify a management console without interception or perform a new load of the application without rebooting the platform. In such a case the comparator may be isolated from target software 103. For example, the comparator and the target software may run in different address spaces which may be completely separate from each other. Examples would include two ring three processes or two separate virtual machines (VMs) respectively for comparator 120 and target software 103. When the target software is a base component (e.g., ring 0 or a virtual machine monitor (VMM)), the architecture may provide a place for the execution of the comparator.

In an embodiment, comparator 120 may have access to runtime buffer 115. As the target software is continually filling the buffer with additional events (e.g., outputs due to encountering instrumented trace elements or assertions), the comparator may read the buffer and compare the real-time trace to the baseline trace. The comparator's access to the buffer may be such that neither the target software, nor other software such as malware, can interfere with the comparator's buffer access (e.g., due to use of an isolation mechanism that isolates access to the buffer to only specified functions). Also, the comparator may have read access to the buffer but any write access may be mitigated by the architecture. Thus, in an embodiment only certain entities (e.g., SVEN hardware) may write an event (e.g., a SVEN trace event) to the buffer.

In an embodiment target software 103 is made unaware (e.g., via virtualization) of when the comparator performs a comparison. In embodiments where the comparator operates on a schedule, any scheduling occurs outside of the purview of the target software.

In an embodiment, the comparator (e.g., 120) may do a direct comparison between two traces to produce a "yes" or "no" answer regarding whether the traces match. However, in other embodiments the comparator may produce results that lead to a "confidence level". For example, the comparator may yield a "complete" rating for ICs that are perfect matches, "high" for ICs that are within 10% of each other, and "low" for ICs that deviate from one another by more than 10%. Any report may be subject to security (e.g., digital signatures) and the like.

Further, comparator 120 may operate within an isolated environment (e.g., Trusted Platform Module) that provides a protected execution location. The execution guarantees the ability to operate without interference. This guarantee provides the location to execute the comparator such that the comparator is isolated from all other platform processes.

FIGS. 3-7 address expected trace outputs from various software architectures. In an embodiment, these outputs generate the baseline and real-time traces 106, 116 that are compared via comparator 120. The expected traces only show a filtered amount of information for ease of explanation but in some embodiments typical header information may still be present in each event.

FIG. 3 includes "straight code" with a function that only uses software assertions with no associated hardware trace data. Lines 303 and 306 indicate inserted trace event invoking "assertions" (see "DEVH" entries). In other words, these "assertions" collectively generate baseline and real-time traces 106, 116 when execution of the code interfaces those assertions. As a result of the two different assertions at lines 303, 306, and the fact that "straight code" (e.g., no loops) is at issue, there are only two expected trace events at timestamps (TS) 45.86 and 00.02. As indicated above, in various embodiments ICs are used that show the "delta" or instruction count change since the last assertion. In the case of FIG. 3 there are ICs of 2580 and 1256. A comparator would have this information as a baseline trace. A real-time trace would then be generated (110, 106) and compared (120) with the baseline trace. With no external hardware use, the code of FIG. 3 should run the same way every time so the IC at the exit should be a constant value. The entry IC may differ, as it will depend on how the function is called. The comparator should see little variability in the IC values and should judge accordingly (e.g., "complete", "high", "low" levels of integrity). Even the enter IC should be close to the same.

FIG. 4 includes "straight code" with external service. This type of function has no control flow changes but does call an external service. In this example there are four trace assertions at lines 403, 406, 408, 410 and there are four corresponding trace events. However, there are two different expected traces: "Expected trace 1" and "Expected trace 2". Specifically, this is a straight compare. The sequence must be present or the function did not execute properly. The external function ("ExternalABC") may, or may not, have assertions. The "Expected trace 1" shows the result when the external function does not have assertions. The "Expected trace 2" shows the result when the external function does have assertions (e.g., SVEN assertions). In "Expected trace 1" the post assertion shows a count of 25890 that includes the overhead for the function call and all of the operations performed by "ExternalABC." In "Expected trace 2" the post assertion shows the same value (258900) but the internal operations show the breakdown of those instructions. The post processing could have just as easily displayed the delta from the exit of "ExternalABC". Either way there is the same number of instructions.

FIG. 5 includes code with a loop. Loops are common in code and provide a way to perform the same operation repeatedly. Loops are also one area where attacks commonly occur due to mistakes such as buffer overflows. In this example there are assertions at lines 503, 504, 507, and 512 but there are more than four trace events due to the loop. In an embodiment if the code asserts the number of iterations to look for, the baseline trace will provide the instruction count for a single iteration and the comparator can ensure that each iteration uses the correct number of instructions. If the loop includes early out checks, that path through the code may also provide trace assertions. If the loop count runs over, that is direct evidence of an issue indicating the code did not operate correctly. Notably, in FIG. 5 the IC is larger for count 0 than the remaining iterations. In this case the first iteration of a loop counts the instructions that precede the loop and the setup of the loop constructs. All subsequent iterations of the loop count the instructions from the bottom of the loop back to the top. This explains the different ICs for count 0 versus the other iterations.

FIG. 6 includes code with an IF statement that allows the code to make a decision. There are assertions at lines 603, 605, 608, 613, and 616. The comparison is somewhat more complex due to the variance necessarily brought on by an IF statement. Depending on the complexity of the code a software provider may wish to only instrument various portions of the IF related code. If the code path is addressed and stored as a baseline trace then the intertrace compare is straight forward. However, if the code path is not in the baseline the comparison may return a verdict of "unknown". Various embodiments may handle branches in various ways. For example, an embodiment may place a branch indicator in the target code along with additional assertions to indicate which branch is taken. Another embodiment may create a baseline such that the baseline knows about both paths and the comparison has a way to select either path.

An embodiment includes detecting malware activity based on the malware executing a number of instructions that exceeds an instruction count extending from the first baseline trace event to the second baseline trace event; wherein the malware is at least partially included in the application between the first and second assertions. As a result, the embodiment limits the computational power of malware. For example, if malware wants to hide from detection the malware must operate within the number of instructions between two trace events. Thus, the malware has a computational limit to the amount of work that is possible between two trace events.

FIG. 7 includes code with hardware interaction. The code has assertions at lines 703, 704, and 708. Here the hardware interaction is for hardware resource R1 (e.g., a register). This example shows an embodiment combining trace data (e.g., SVEN data) with OMAR hardware interactions. OMAR is a silicon feature (e.g., included on some Intel® consumer electronics platforms) that efficiently collects traces of hundreds of internal system on a chip (SoC) signals into host memory. The trace assertions indicate which resource the code will access. The resulting trace contains the identification and use of the resource. The comparison is straight forward, but would normally include pre and post assertions to keep track of when the resource access occurs.

Embodiments may be implemented in many different system types. Referring now to FIG. 8, shown is a block diagram of a system in accordance with an embodiment of the invention which may be found in a desktop, laptop, mobile internet device, mobile computing node, Smartphone, cell phone, radio, fixed computing node, and the like. Multiprocessor system 800 is a point-to-point interconnect system, and includes a first processor 870 and a second processor 880 coupled via a point-to-point interconnect 850. Each of processors 870 and 880 may be multicore processors. The term "processor" may refer to any device or portion of a device that processes electronic data from registers and/or memory to transform that electronic data into other electronic data that may be stored in registers and/or memory. First processor 870 may include a memory controller hub (MCH) and point-to-point (P-P) interfaces. Similarly, second processor 880 may include a MCH and P-P interfaces. The MCHs may couple the processors to respective memories, namely memory 832 and memory 834, which may be portions of main memory (e.g., a dynamic random access memory (DRAM)) locally attached to the respective processors. First processor 870 and second processor 880 may be coupled to a chipset 890 via P-P interconnects, respectively. Chipset 890 may include P-P interfaces. Furthermore, chipset 890 may be coupled to first bus 816 via an interface. Various input/output (I/O) devices 814 may be coupled to first bus 816, along with a bus bridge 818, which couples first bus 816 to a second bus 820. Various devices may be coupled to second bus 820 including, for example, keyboard/mouse 822, communication devices 826, and data storage unit 828 such as a disk drive or other mass storage device, which may include code 830, in one embodiment. Code may be included in one or more memories including memory 828, 832, 834, memory coupled to system 800 via a network, and the like. Further, an audio I/O 824 may be coupled to second bus 820.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as DRAMs, static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (835). However, in another embodiment, logic also includes software or code (831). Such logic may be integrated with hardware, such as firmware or micro-code (836). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

At times terms and principles such as SVEN, OMAR, and the like are used for purposes of explanation but embodiments are not limited to using SVEN, OMAR or any other technique or system. Assertions and traces may be implemented using various software and hardware debug tools such as, without limitation, System Trace Protocol (STP) from Mobile Industry Processor Interface (MIPI) (www*mipi*org) and other debug interfaces defined by MIPI. Also, the term "application" should be interpreted broadly to include user applications, operating systems, drivers, as well as many other forms of software, code, and programs as those terms are defined above. Also, the term "provider" is used above but embodiments of the invention are not limited to any one party. Further, at times above embodiments are said to include an application that compares the baseline and real-time trace values. The comparator that compares the traces need not be in any specific location and may be located in, for example, the target application (e.g., 103) or outside of the target application by a completely separate process.

An embodiment includes a method executed by at least one processor comprising: receiving first and second baseline trace events for an application having first and second assertions, the first and second baseline trace events respectively corresponding to the first and second assertions; after receiving the first and second baseline trace events, receiving first and second real-time trace events that are generated by executing the application and that respectively correspond to the first and second assertions; and comparing the first and second baseline trace events respectively to the first and second real-time trace events. An embodiment comprises generating, via the first and second assertions, (a) the first and second baseline trace events, and (b) the first and second real-time trace events. An embodiment comprises determining a variance between one of the first and second baseline trace events and one of the first and second real-time trace events. An embodiment comprises comparing the variance to a predetermined value to determine whether the application is operating correctly. In an embodiment the first and second baseline trace events respectively include first and second baseline instruction counts and the first and second real-time trace events respectively include first and second real-time instruction counts. In an embodiment comparing the first and second baseline trace events respectively to the first and second real-time trace events includes comparing the first and second baseline instruction counts respectively to the first and second real-time instruction counts. In an embodiment at least one of the first and second assertions is included in a branch of a branched code portion. In an embodiment the first and second assertions are each included in a single loop of a code portion. In an embodiment the first and second baseline trace events respectively include first and second baseline timestamps and the first and second real-time trace events respectively include first and second real-time timestamps; and comparing the first and second baseline trace events respectively to the first and second real-time trace events includes comparing the first and second baseline timestamps respectively to the first and second real-time timestamps. An embodiment comprises comparing the first and second baseline trace events respectively to the first and second real-time trace events in real-time. An embodiment comprises detecting malware activity based on comparing the first and second baseline trace events respectively to the first and second real-time trace events. In an embodiment comparing the first and second baseline trace events respectively to the first and second real-time trace events includes receiving an evaluation, from a remotely located computing node, that is based on comparing the first and second baseline trace events respectively to the first and second real-time trace events. In an embodiment the first and second baseline trace events are initially generated by a first party on a first computing platform and the first and second real-time trace events are initially generated by a second party on a second computing platform. An embodiment comprises the application executing on a first computing node; a comparator logic module compares the first and second baseline trace events respectively to the first and second real-time trace events; and the comparator logic module executes on one of the first computing node and a second computing node remotely coupled to the first computing node. In an embodiment a comparator logic module compares the first and second baseline trace events respectively to the first and second real-time trace events; and the comparator logic executes in a first secure environment and the application executes in a second secure environment isolated from the first secure environment. An embodiment includes detecting malware activity based on the malware executing a number of instructions that exceeds an instruction count extending from the first baseline trace event to the second baseline trace event; wherein the malware is at least partially included in the application between the first and second assertions.

In an embodiment an apparatus comprises: at least one memory and at least one processor, coupled to the at least one memory, to perform operations comprising: determining first and second baseline trace events for an application having first and second assertions, the first and second baseline trace events respectively corresponding to the first and second assertions; determining first and second real-time trace events respectively corresponding to the first and second assertions; and determining whether the application is operating correctly based on a comparison between the first and second baseline trace events and the first and second real-time trace events. In an embodiment the first and second baseline trace events respectively include first and second baseline instruction counts and the first and second real-time trace events respectively include first and second real-time instruction counts. In an embodiment the operations comprise: determining a variance between one of the first and second baseline trace events and one of the first and second real-time trace events; and comparing the variance to a predetermined value to determine whether the application is operating correctly.

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to perform a method comprising:
   receiving first and second baseline trace events for an application including first and second assertions, the first and second baseline trace events respectively generated by the first and second assertions during a first execution of the application operating correctly, wherein the first and second assertions are tracing instructions embedded in the application;
   after receiving the first and second baseline trace events, receiving first and second real-time trace events that are respectively generated by the first and second assertions during a second execution of the application, wherein each trace event is a data element including a count of instructions since a last preceding assertion; and
   determining whether the application is operating correctly in the second execution based on comparing the first and second baseline trace events respectively to the first and second real-time trace events.

2. The at least one non-transitory medium of claim 1, wherein the first and second baseline trace events are provided by a software provider of the application.

3. The at least one non-transitory medium of claim 1, the method comprising determining a variance between one of the first and second baseline trace events and one of the first and second real-time trace events.

4. The at least one non-transitory medium of claim 3, the method comprising comparing the variance to a predetermined value to determine whether the application is operating correctly in the second execution.

5. The at least one non-transitory medium of claim 1, wherein the first and second baseline trace events respectively include first and second baseline instruction counts and the first and second real-time trace events respectively include first and second real-time instruction counts.

6. The at least one non-transitory medium of claim 5, wherein comparing the first and second baseline trace events respectively to the first and second real-time trace events includes comparing the first and second baseline instruction counts respectively to the first and second real-time instruction counts.

7. The at least one non-transitory medium of claim 1, wherein at least one of the first and second assertions is included in a branch of a branched code portion.

8. The at least one non-transitory medium of claim 1, wherein the first and second assertions are each included in a single loop of a code portion.

9. The at least one non-transitory medium of claim 1, wherein:
the first and second baseline trace events respectively include first and second baseline timestamps and the first and second real-time trace events respectively include first and second real-time timestamps; and
comparing the first and second baseline trace events respectively to the first and second real-time trace events includes comparing the first and second baseline timestamps respectively to the first and second real-time timestamps.

10. The at least one non-transitory medium of claim 1, the method comprising comparing the first and second baseline trace events respectively to the first and second real-time trace events in real-time.

11. The at least one non-transitory medium of claim 1, the method comprising detecting malware activity based on comparing the first and second baseline trace events respectively to the first and second real-time trace events.

12. The at least one non-transitory medium of claim 1, wherein comparing the first and second baseline trace events respectively to the first and second real-time trace events includes receiving an evaluation, from a remotely located computing node, that is based on comparing the first and second baseline trace events respectively to the first and second real-time trace events.

13. The at least one non-transitory medium of claim 1, wherein the first and second baseline trace events are generated by a first party on a first computing platform, and the first and second real-time trace events are generated by a second party on a second computing platform.

14. The at least one non-transitory medium of claim 1, wherein:
the application is executed on a first computing node;
a comparator logic module compares the first and second baseline trace events respectively to the first and second real-time trace events; and
the comparator logic module executes on one of the first computing node and a second computing node remotely coupled to the first computing node.

15. The at least one non-transitory medium of claim 1, wherein:
a comparator logic module compares the first and second baseline trace events respectively to the first and second real-time trace events; and
the comparator logic executes in a first secure environment and the application executes in a second secure environment isolated from the first secure environment.

16. The at least one non-transitory medium of claim 1, the method comprising detecting malware activity based on the malware executing a number of instructions that exceeds an instruction count extending from the first baseline trace event to the second baseline trace event; wherein the malware is at least partially included in the application between the first and second assertions.

17. The at least one non-transitory medium of claim 1, wherein each trace event also includes a timestamp value.

18. An apparatus comprising:
at least one memory, and
at least one processor, coupled to the at least one memory, to perform operations comprising:
determining first and second baseline trace events for an application including first and second assertions, the first and second baseline trace events respectively generated by the first and second assertions during a first execution of the application operating correctly, wherein the first and second assertions are tracing instructions embedded in the application;
determining first and second real-time trace events that are respectively generated by the first and second assertions during a second execution of the application, wherein each trace event is a data element including a count of instructions since a last preceding assertion; and
determining whether the application is operating correctly in the second execution based on a comparison between the first and second baseline trace events and the first and second real-time trace events.

19. The apparatus of claim 18, wherein the first and second baseline trace events respectively include first and second baseline instruction counts and the first and second real-time trace events respectively include first and second real-time instruction counts.

20. The apparatus of claim 18, wherein the operations comprise:
determining a variance between one of the first and second baseline trace events and one of the first and second real-time trace events; and
comparing the variance to a predetermined value to determine whether the application is operating correctly.

21. The apparatus of claim 18, wherein each trace event also includes a timestamp value.

* * * * *